US012614654B2

(12) United States Patent
Okazaki et al.

(10) Patent No.: US 12,614,654 B2
(45) Date of Patent: Apr. 28, 2026

(54) COIL COMPONENT AND MANUFACTURING METHOD THEREFOR

(71) Applicant: TDK Corporation, Tokyo (JP)

(72) Inventors: Michitaka Okazaki, Tokyo (JP); Ikuya Kokubo, Tokyo (JP); Takuya Takeuchi, Tokyo (JP); Masaki Endo, Tokyo (JP); Masaki Yoneyama, Tokyo (JP)

(73) Assignee: TDK Corporation, Tokyo (JP)

( * ) Notice: Subject to any disclaimer, the term of this patent is extended or adjusted under 35 U.S.C. 154(b) by 240 days.

(21) Appl. No.: 18/555,158

(22) PCT Filed: Mar. 18, 2022

(86) PCT No.: PCT/JP2022/012663
§ 371 (c)(1),
(2) Date: Oct. 12, 2023

(87) PCT Pub. No.: WO2022/230441
PCT Pub. Date: Nov. 3, 2022

(65) Prior Publication Data
US 2024/0203625 A1 Jun. 20, 2024

(30) Foreign Application Priority Data
Apr. 26, 2021 (JP) ................................. 2021-073769

(51) Int. Cl.
*H01F 5/06* (2006.01)
*H01F 41/12* (2006.01)

(52) U.S. Cl.
CPC ............ *H01F 5/06* (2013.01); *H01F 41/122* (2013.01)

(58) Field of Classification Search
None
See application file for complete search history.

(56) References Cited

U.S. PATENT DOCUMENTS

2009/0115563 A1* 5/2009 Arata .................. H01F 17/0013 336/200
2021/0175004 A1* 6/2021 Kim ...................... H01F 41/041
(Continued)

FOREIGN PATENT DOCUMENTS

CN 119694735 A * 3/2025 ......... H01F 17/0006
JP 2019-140202 A 8/2019

OTHER PUBLICATIONS

Machine translation of CN-119694735-A (Year: 2025).*
(Continued)

*Primary Examiner* — Bernard Rojas
(74) *Attorney, Agent, or Firm* — Rimon P.C.

(57) ABSTRACT

To suppress an increase in DC resistance due to surface roughening in a coil component including a spiral pattern. A coil component manufacturing method includes: a first step of forming a conductor layer including a spiral pattern spirally wound in a plurality of turns; a second step of selectively roughening an upper surface and an upper region of a peripheral-direction side surface of the spiral pattern; and a third step of forming an insulating resin layer so as to embed therein the conductor layer, and the first to third steps are repeatedly performed. Since the upper surface and the upper region of the side surface of the spiral pattern are selectively roughened, it is possible to suppress an increase in DC resistance due to excessive roughening at the lower region of the side surface.

6 Claims, 5 Drawing Sheets

1

(56) References Cited

U.S. PATENT DOCUMENTS

| | | | | |
|---|---|---|---|---|
| 2022/0102038 | A1* | 3/2022 | Nagai | H01F 17/0013 |
| 2023/0386736 | A1* | 11/2023 | Kim | H01F 17/0013 |

OTHER PUBLICATIONS

International Search Report issued in corresponding International Patent Application No. PCT/JP2022/012663, dated May 17, 2022, with English translation.

* cited by examiner

COIL COMPONENT AND MANUFACTURING METHOD THEREFOR

CROSS REFERENCE TO RELATED APPLICATIONS

This application is the U.S. National Phase under 35 U.S.C. § 371 of International Application No. PCT/JP2022/012663, filed on Mar. 18, 2022, which claims the benefit of Japanese Patent Application No. 2021-073769, filed on Apr. 26, 2021, the entire contents of each are hereby incorporated by reference.

TECHNICAL FIELD

The present invention relates to a coil component and a manufacturing method therefor and, more particularly, to a coil component having a structure in which a plurality of conductor layers each including a spiral pattern spirally wound in a plurality of turns and a plurality of insulating resin layers are alternately stacked and a manufacturing method for such a coil component.

BACKGROUND ART

The coil component described in Patent Document 1 is known as a coil component having a structure in which a plurality of conductor layers each including a spiral pattern spirally wound in a plurality of turns and a plurality of insulating resin layers are alternately stacked. In a coil component having such a structure, the surface of the spiral pattern can be roughened so as to enhance adhesion between the spiral pattern and the insulating resin layer.

CITATION LIST

Patent Document

[Patent Document 1] JP 2019-140202A

DISCLOSURE OF THE INVENTION

Problem to be Solved by the Invention

However, excessively roughening the surface of the spiral pattern results in a reduction in sectional area, which disadvantageously causes an increase in DC resistance.

It is therefore an object of the present invention to provide a coil component capable of suppressing an increase in DC resistance due to surface roughening and a manufacturing method for such a coil component.

Means for Solving the Problem

A coil component according to the present invention is a coil component having a structure in which a plurality of conductor patterns each including a spiral pattern spirally wound in a plurality of turns and a plurality of insulating resin layers are alternately stacked. A space region positioned between radially adjacent turns of the spiral pattern and filled with the insulating resin layer has a radial aspect ratio of 2 to 4, and the side surface of the spiral pattern along the peripheral direction has a larger surface roughness at its upper region than its lower region.

According to the present invention, the upper region of the side surface of the spiral pattern is significantly roughened, while surface roughening at the lower region is suppressed, so that it is possible to suppress an increase in DC resistance due to a reduction in sectional area while enhancing adhesion between the spiral pattern and the insulating resin layer.

In the present invention, the upper region may be wider than the lower region. This can further enhance adhesion between the spiral pattern and the insulating resin layer.

In the present invention, the surface roughness Sa of the upper region may be 0.2 μm or more, and the surface roughness Sa of the lower region may be 0.1 μm or less. This makes it possible to further suppress an increase in DC resistance due to a reduction in sectional area while enhancing adhesion between the spiral pattern and the insulating resin layer.

In the present invention, out of the surfaces along the peripheral direction of the spiral pattern, the lower region of the inner peripheral wall of the innermost turn of the spiral pattern and the lower region of the outer peripheral wall of the outermost turn may be larger in surface roughness than the lower regions of other side surfaces of the spiral pattern. This achieves further enhancement between the spiral pattern and the insulating resin layer.

A manufacturing method for the coil component according to the present invention includes: a first step of forming a conductor layer including a spiral pattern spirally wound in a plurality of turns; a second step of selectively roughening the upper surface and the upper region of the peripheral-direction side surface of the spiral pattern; and a third step of forming an insulating resin layer so as to embed therein the conductor layer, and the first to third steps are repeatedly performed.

According to the present invention, the upper surface and the upper region of the side surface of the spiral pattern are selectively roughened, so that it is possible to suppress an increase in DC resistance due to excessive surface roughening at the lower region of the side surface.

In the present invention, the space region positioned between radially adjacent turns of the spiral pattern may have a radial aspect ratio of 2 to 4, and circulation of roughening liquid at the lower region of the side surface of the spiral pattern may be suppressed in the second step. By performing surface roughening under such a condition, the surface roughness at the upper region of the side surface of the spiral pattern can be made larger than the surface roughness at the lower region.

Advantageous Effects of the Invention

As described above, according to the present invention, there can be provided a coil component capable of suppressing an increase in DC resistance due to surface roughening and a manufacturing method for such a coil component.

MODE FOR CARRYING OUT THE INVENTION

Hereinafter, preferred embodiments of the present invention will be described in detail with reference to the accompanying drawings.

Figure 1:
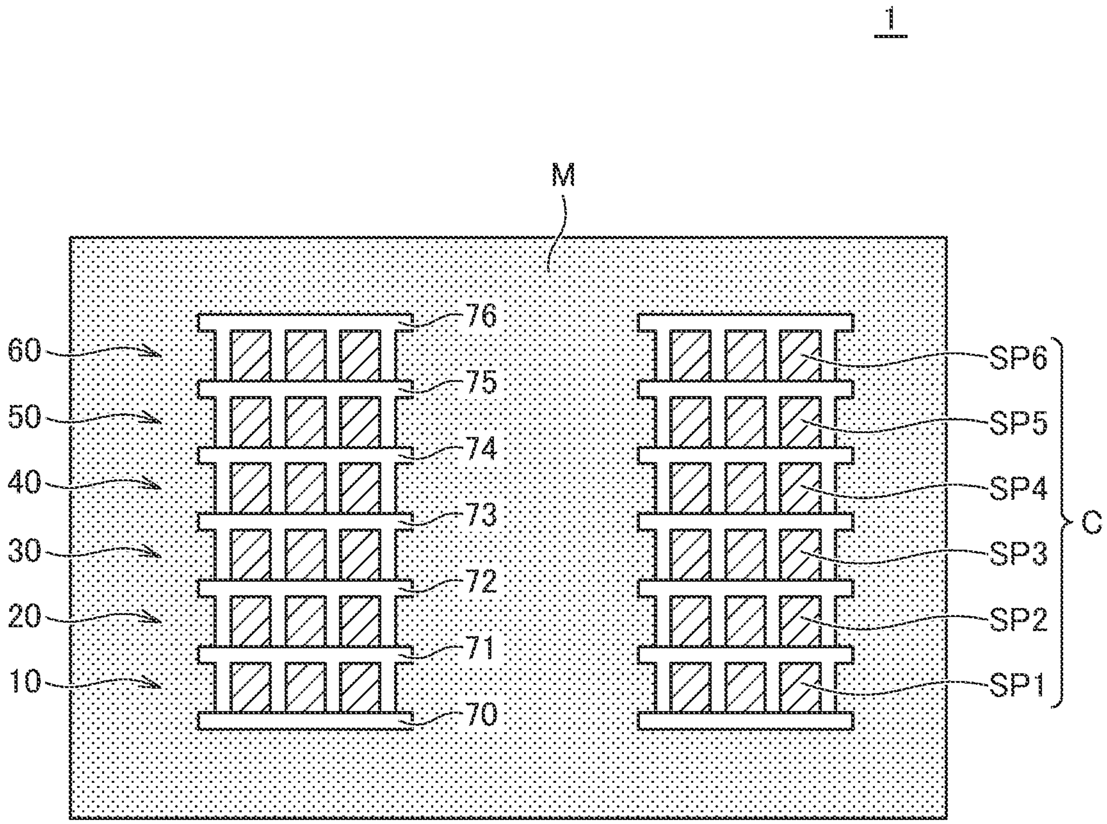
FIG. 1 is a schematic cross-sectional view for explaining the structure of a coil component 1 according to an embodiment of the present invention.

FIG. 1 is a schematic cross-sectional view for explaining the structure of a coil component 1 according to an embodiment of the present invention.

The coil component 1 according to a first embodiment is a surface-mount chip component and includes, as illustrated in FIG. 1, a magnetic member M and a coil pattern C embedded in the magnetic member M. Although the configuration of the coil pattern C will be described in detail later, the coil pattern C according to the present embodiment includes patterns SP1 to SP6 each spirally wound in a plurality of turns.

The magnetic member M is a composite member containing magnetic metal filler made of iron (Fe) or a permalloy-based material and a resin binder and forms a magnetic path for magnetic flux generated by a current flowing in the coil pattern C. The resin binder is preferably epoxy resin in the form of liquid or powder. The magnetic member M is positioned on both sides of the coil pattern C in the axial direction, in the inner diameter area of the coil pattern C, and in the outside area of the coil pattern C in the radial direction.

Figure 2:
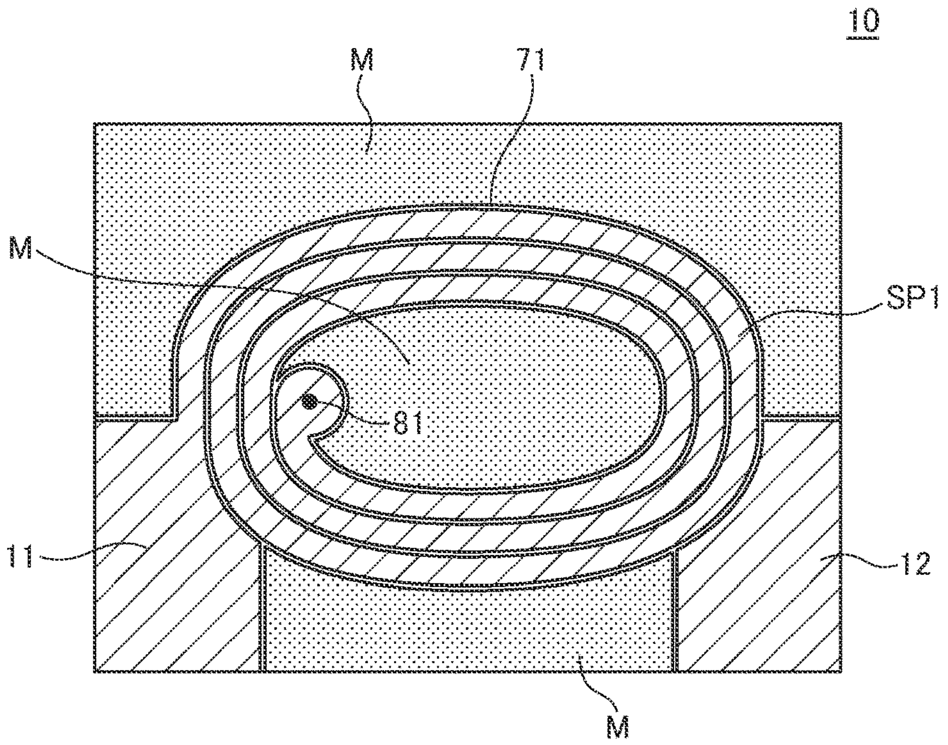
FIG. 2 is a schematic plan view of a conductor layer 10.
Figure 3:
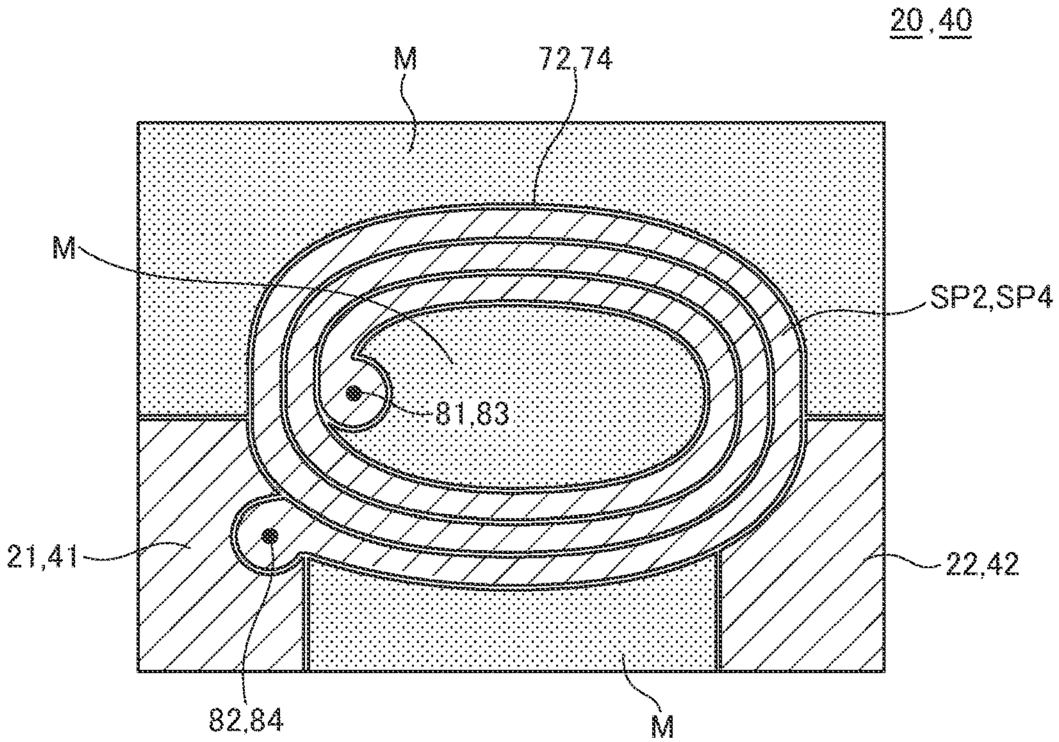
FIG. 3 is a schematic plan view of conductor layers 20 and 40.
Figure 4:
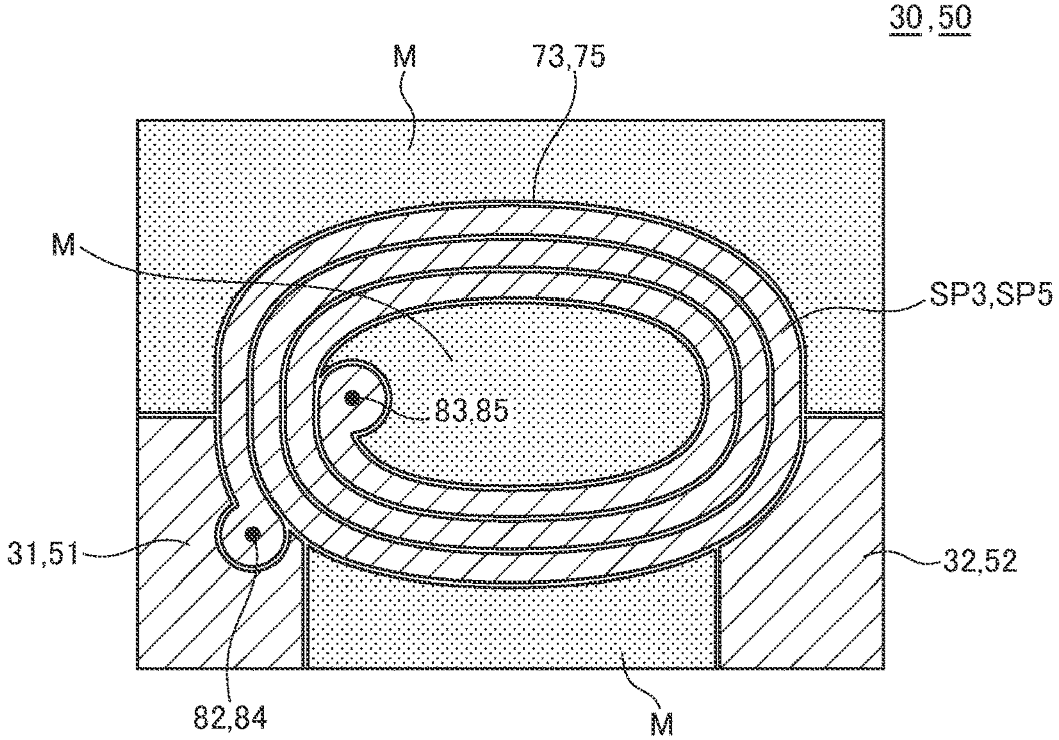
FIG. 4 is a schematic plan view of conductor layers 30 and 50.
Figure 5:
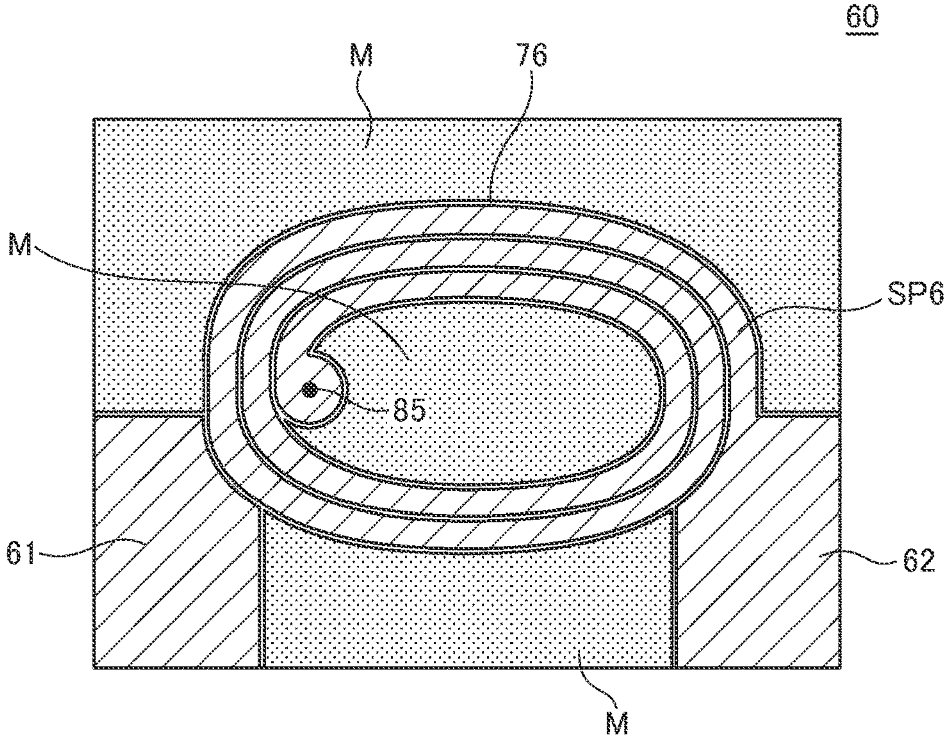
FIG. 5 is a schematic plan view of a conductor layer 60.

As illustrated in FIG. 1, insulating resin layers 70 to 76 and conductor layers 10, 20, 30, 40, 50, and 60 are alternately stacked in the axial direction. The planar shape of the conductor layer 10 is illustrated in FIG. 2, the planar shape of each of the conductor layers 20 and 40 is illustrated in FIG. 3, the planar shape of each of the conductor layers 30 and 50 is illustrated in FIG. 4, and the planar shape of the conductor layer 60 is illustrated in FIG. 5. The conductor layers 10, 20, 30, 40, 50, and 60 have spiral patterns SP1 to SP6, respectively, and the upper or lower surfaces of the spiral patterns SP1 to SP6 are covered with the insulating resin layers 70 to 76, respectively. The side surfaces of the spiral patterns SP1 to SP6 are covered with parts of the insulating resin layers 70 to 76, respectively. The upper and lower surfaces of the respective spiral patterns SP1 to SP6 refer to surfaces substantially perpendicular to the coil axis, and the side surfaces of the respective spiral patterns SP1 to SP6 refer to surfaces substantially perpendicular to the radial direction.

The spiral patterns SP1 to SP6 are connected to one another through via holes formed in the respective insulating resin layers 71 to 75 to constitute one coil conductor. The conductor layers 10, 20, 30, 40, 50, and 60 are preferably made of copper (Cu). Of the insulating resin layers 70 to 76, at least the insulating resin layers 71 to 75 are made of a non-magnetic material. The insulating resin layer 70 in the lowermost layer and the insulating resin layer 76 in the uppermost layer may have magnetism.

The conductor layer 10 is the first conductor layer formed on the upper surface of the insulating resin layer 70 and includes, as illustrated in FIG. 2, the spiral pattern SP1 spirally wound in about three turns and two electrode patterns 11 and 12. The lower surface of the spiral pattern SP1 is covered with the insulating resin layer 70, and the side and upper surfaces thereof are covered with the insulating resin layer 71. As a result, the insulating resin layer 71 is interposed between the spiral pattern SP1 and the magnetic member M. The electrode pattern 11 is connected to the outer peripheral end of the spiral patterns SP1. The electrode pattern 12 is provided independently of the spiral pattern SP1.

The conductor layer 20 is the second conductor layer formed on the upper surface of the conductor layer 10 through the insulating resin layer 71 and includes, as illustrated in FIG. 3, the spiral pattern SP2 spirally wound in about three turns and two electrode patterns 21 and 22. The lower surface of the spiral pattern SP2 is covered with the insulating resin layer 71, and the side and upper surfaces thereof are covered with the insulating resin layer 72. As a result, the insulating resin layer 72 is interposed between the spiral pattern SP2 and magnetic member M. The electrode patterns 21 and 22 are both provided independently of the spiral pattern SP2.

The conductor layer 30 is the third conductor layer formed on the upper surface of the conductor layer 20 through the insulating resin layer 72 and includes, as illustrated in FIG. 4, the spiral pattern SP3 spirally wound in about three turns and two electrode patterns 31 and 32. The lower surface of the spiral pattern SP3 is covered with the insulating resin layer 72, and the side and upper surfaces thereof are covered with the insulating resin layer 73. As a result, the insulating resin layer 73 is interposed between the spiral pattern SP3 and the magnetic member M. The electrode patterns 31 and 32 are both provided independently of the spiral pattern SP3.

The conductor layer 40 is the fourth conductor layer formed on the upper surface of the conductor layer 30 through the insulating resin layer 73 and includes, as illustrated in FIG. 3, the spiral pattern SP4 spirally wound in about three turns and two electrode patterns 41 and 42. The lower surface of the spiral pattern SP4 is covered with the insulating resin layer 73, and the side and upper surfaces thereof are covered with the insulating resin layer 74. As a result, the insulating resin layer 74 is interposed between the spiral pattern SP4 and the magnetic member M. The electrode patterns 41 and 42 are both provided independently of the spiral pattern SP4.

The conductor layer 50 is the fifth conductor layer formed on the upper surface of the conductor layer 40 through the insulating resin layer 74 and includes, as illustrated in FIG. 4, the spiral pattern SP5 spirally wound in about three turns and two electrode patterns 51 and 52. The lower surface of the spiral pattern SP5 is covered with the insulating resin layer 74, and the side and upper surfaces thereof are covered with the insulating resin layer 75. As a result, the insulating resin layer 75 is interposed between the spiral pattern SP5 and the magnetic member M. The electrode patterns 51 and 52 are both provided independently of the spiral pattern SP5.

The conductor layer 60 is the sixth conductor layer formed on the upper surface of the conductor layer 50 through the insulating resin layer 75 and includes, as illustrated in FIG. 5, the spiral pattern SP6 spirally wound in about 2.5 turns and two electrode patterns 61 and 62. The lower surface of the spiral pattern SP6 is covered with the insulating resin layer 75, and the side and upper surfaces thereof are covered with the insulating resin layer 76. As a result, the insulating resin layer 76 is interposed between the spiral pattern SP6 and the magnetic member M. The electrode pattern 62 is connected to the outer peripheral end of the spiral pattern SP6. The electrode pattern 62 is provided independently of the spiral pattern SP6.

The inner peripheral end of the spiral pattern SP1 and the inner peripheral end of the spiral pattern SP2 are connected through a via conductor 81 constituting a part of the conductor layer 20 and penetrating the insulating resin layer 71. The outer peripheral end of the spiral pattern SP2 and the outer peripheral end of the spiral pattern SP3 are connected through a via conductor 82 constituting a part of the conductor layer 30 and penetrating the insulating resin layer 72. The inner peripheral end of the spiral pattern SP3 and the inner peripheral end of the spiral pattern SP4 are connected through a via conductor 83 constituting a part of the conductor layer 40 and penetrating the insulating resin layer 73. The outer peripheral end of the spiral pattern SP4 and the outer peripheral end of the spiral pattern SP5 are connected through a via conductor 84 constituting a part of the conductor layer 50 and penetrating the insulating resin layer 74. The inner peripheral end of the spiral pattern SP5 and the inner peripheral end of the spiral pattern SP6 are connected through a via conductor 85 constituting a part of the conductor layer 60 and penetrating the insulating resin layer 75. As a result, the spiral patterns SP1 to SP6 are connected in series to form a coil conductor having a plurality of turns. The electrode patterns 11, 21, 31, 41, 51, and 61 are exposed from the magnetic member M and used as one external terminal, and the electrode patterns 12, 22, 32, 42, 52, and 62 are exposed from the magnetic member M and used as the other external terminal.

Figure 6:
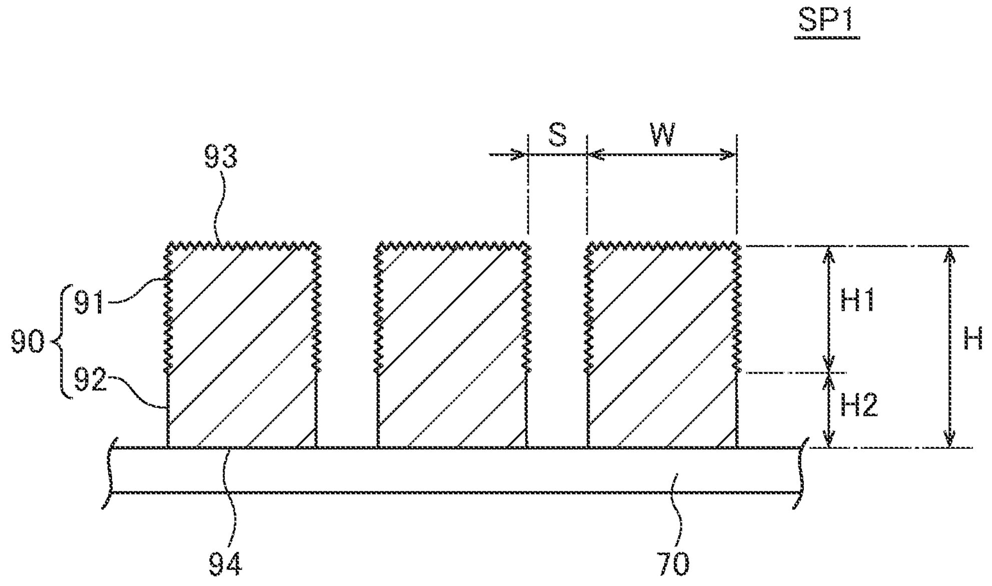
FIG. 6 is an enlarged view for explaining the shape of a spiral pattern SP1.

FIG. 6 is an enlarged view for explaining the shape of the spiral pattern SP1, which illustrates a cross section perpendicular to the radial direction. The cross-sectional shape of each of the spiral patterns SP2 to SP6 is the same as that illustrated in FIG. 6.

As illustrated in FIG. 6, the spiral pattern SP1 has a height H in the axial direction and a width W in the radial direction. Accordingly, the aspect ratio of the spiral pattern SP1 in the radial direction is H/W (=about 0.5 to 1.5). The radial width of a space region between the radially adjacent turns of the spiral pattern SP1 is S and, accordingly, the aspect ratio of the space region in the radial direction is H/S(=2 to 4). The space region is filled with the insulating resin layer 71 as illustrated in FIG. 1.

The surface of the spiral pattern SP1 has a side surface 90 extending in the peripheral direction and upper and bottom surfaces 93 and 94 which are substantially perpendicular to the axial direction. The side surface 90 and upper surface 93 contact the insulating resin layer 71, and the bottom surface 94 contacts the insulating resin layer 70. In the present embodiment, the side surface 90 includes an upper region 91 positioned on the upper surface 93 side and a lower region 92 positioned on the bottom surface 94 side, and the upper region 91 is larger in surface roughness than the lower region 92. Specifically, the surface roughness Sa (defined in ISO 25178) at the upper region 91 is preferably 0.2 m or more, and the surface roughness Sa at the lower region 92 is preferably 0.1 μm or less. The surface roughness Sa of the upper surface 93 is also preferably 0.2 μm or more. The surface roughness Sa of the bottom surface 94 reflects the surface property of the insulating resin layer 70 almost as it is.

As described above, in the present embodiment, the upper surface 93 and the upper region 91 of the side surface 90 of each of the spiral patterns SP1 to SP6 are significantly roughened, allowing achievement of high adhesion between the spiral patterns SP1 to SP6 and the insulating resin layers 71 to 76. Further, the lower region 92 of the side surface 90 is hardly roughened, allowing suppression of an increase in DC resistance due to a reduction in sectional area. Assuming that the height of the upper region 91 in the axial direction is H1, and that the height of the lower region 92 in the axial direction is H2, it is preferable to satisfy H1>H2.

However, when the height H1 is excessively large, DC resistance increases due to a reduction in sectional area, so that the height H1 is preferably set in the range of 1.5 times to twice the height H2.

The following describes a manufacturing method for the coil component 1 according to the present embodiment.

Figure 7:
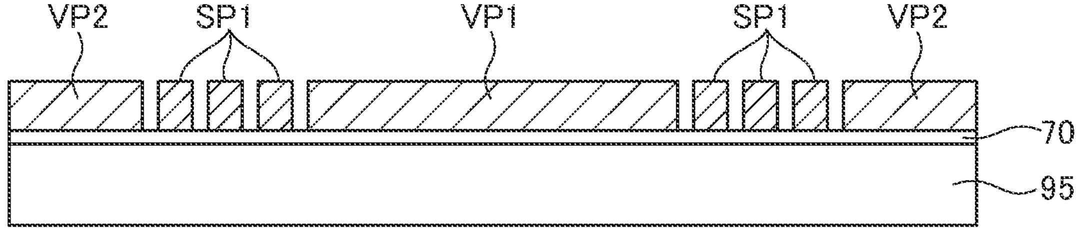
FIG. 7 is a process diagram for explaining the method of manufacturing the coil component 1.

As illustrated in FIG. 7, the insulating resin layer 70 is formed on the surface of a substrate 95, and then the conductor layer 10 is formed on the surface of the insulating resin layer 70. The conductor layer 10 includes the spiral pattern SP1 and sacrificial patterns VP1 and VP2. The sacrificial pattern VP1 is positioned in the inner diameter area of the coil pattern C, and the sacrificial pattern VP2 is positioned in the outside area of the coil pattern C. The conductor layer 10 can be formed by forming a thin seed layer on the surface of the insulating resin layer 70 and then forming a resist pattern on the surface of the seed layer, followed by electrolytic plating in this state. At this stage, the upper surface 93 and side surface 90 of the spiral pattern SP1 each have a surface roughness Sa as small as 0.1 μm or less.

Figure 8:
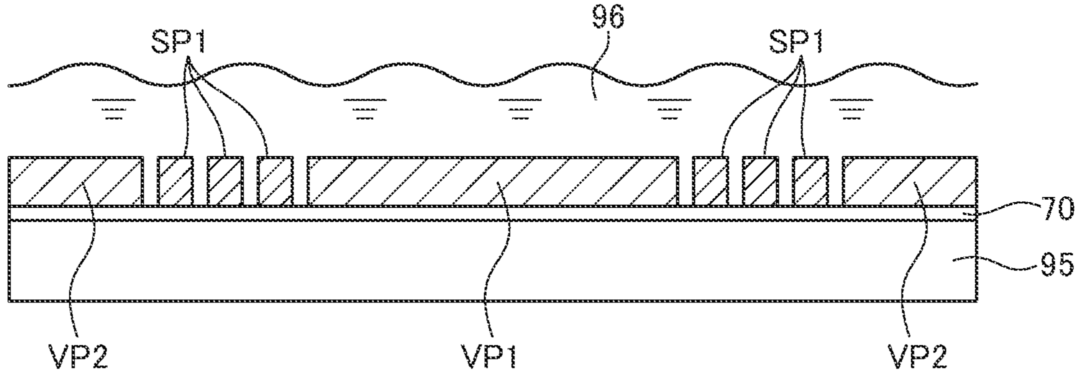
FIG. 8 is a process diagram for explaining the method of manufacturing the coil component 1.

Then, as illustrated in FIG. 8, the conductor layer 10 is exposed to roughening liquid 96 to roughen the surface thereof. At this time, surface roughening is carried out under conditions that circulation of the roughening liquid 96 is promoted at the upper region 91 of the spiral pattern SP1 and suppressed at the lower region 92. Such conditions can be achieved by adjusting supply, stirring, and temperature conditions of the roughening liquid 96. In particular, when the aspect ratio of the space region is 2 to 4, the above conditions can be easily achieved, whereby the upper surface 93 and the upper region 91 of the side surface 90 of the spiral pattern SP1 are selectively roughened. As a result, the surface roughness Sa of the upper surface 93 is 0.3 μm or more, and the surface roughness Sa at the upper region 91 of the side surface is 0.2 μm or more. Although the lower region 92 of the side surface is also exposed to the roughening liquid 96 to be slightly roughened; however, as described above, by suppressing circulation of the roughening liquid 96 at the lower region 92, the surface roughness Sa at the lower region 92 can be kept at 0.1 μm or less.

Figure 9:
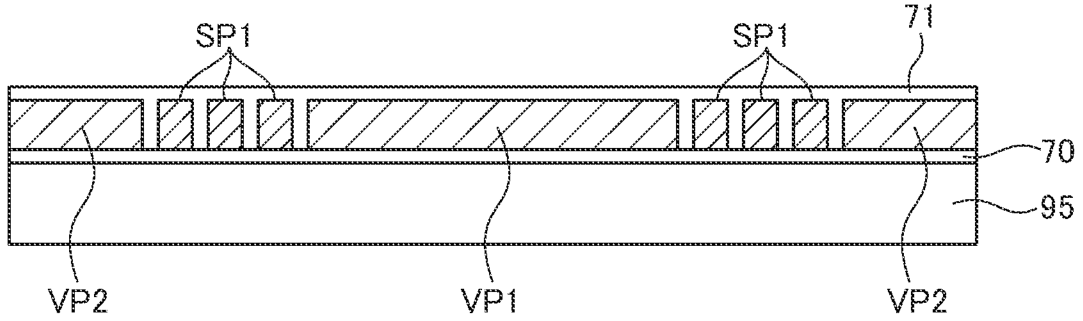
FIG. 9 is a process diagram for explaining the method of manufacturing the coil component 1.

Then, as illustrated in FIG. 9, the insulating resin layer 71 is formed on the surface of the conductor layer so as to be filled in the space region. The insulating resin layer 71 can be formed using a laminate method. Then, by repeating the processes illustrated in FIGS. 7 to 9, the coil pattern C is formed. After that, the sacrificial patterns VP1 and VP2 are removed, and then the coil pattern C is embedded in the magnetic member M, whereby the coil component 1 according to the present embodiment is completed.

As described above, in the present embodiment, surface roughening is carried out under conditions that the upper surface 93 and the upper region 91 of the side surface of each of the spiral patterns SP1 and SP6 are selectively roughened, so that it is possible to suppress an increase in DC resistance while enhancing adhesion between the spiral patterns SP1 to SP6 and the insulating resin layers 71 to 76.

Figure 10:
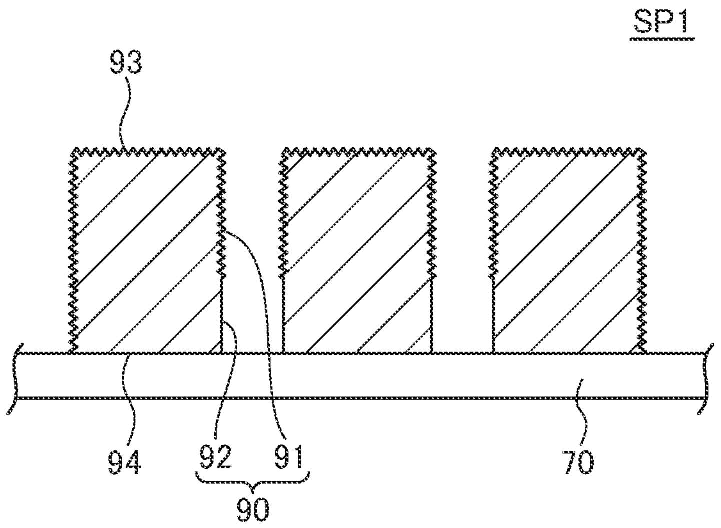
FIG. 10 is an enlarged view for explaining the shape of a spiral pattern SP1 according to a modification.

Further, when surface roughening is carried out using the roughening liquid 96 in a configuration where the radial interval between the spiral pattern SP1 and the sacrificial patterns VP1 and VP2 is larger than the radial interval between the radially adjacent turns of the spiral pattern SP1, the inner peripheral wall of the innermost turn of the spiral pattern SP1 and the outer peripheral wall of the outermost turn of the spiral pattern SP1 are roughened not only at the upper region 91 but also at the lower region 92, as illustrated in FIG. 10, with the result that the surface roughness Sa at the lower region 92 thereof becomes 0.2 μm or more. That is, out of the surfaces along the peripheral direction of the spiral pattern SP1, the lower region 92 of the inner peripheral wall of the innermost turn of the spiral pattern SP1 and the lower region 92 of the outer peripheral wall of the outermost turn are larger in surface roughness than the lower regions 92 of other side surfaces of the spiral pattern SP1. This achieves further enhancement between the spiral patterns SP1 to SP6 and the insulating resin layers 71 to 76.

While the preferred embodiment of the present disclosure has been described, the present disclosure is not limited to the above embodiment, and various modifications may be made within the scope of the present disclosure, and all such modifications are included in the present disclosure.

REFERENCE SIGNS LIST

1 coil component
10. 20, 30, 40, 50, 60 conductor layer
11, 12, 21, 22, 31, 32, 41, 42, 51, 52, 61, 62 electrode pattern
70-76 insulating resin layer
81-85 via conductor
90 side surface
91 upper region
92 lower region
93 upper surface
94 bottom surface
95 substrate
96 roughening liquid
C coil pattern
M magnetic member
SP1-SP6 spiral pattern
VP1, VP2 sacrificial pattern

What is claimed is:

1. A coil component having a structure in which a plurality of conductor patterns each including a spiral pattern spirally wound in a plurality of turns and a plurality of insulating resin layers are alternately stacked, wherein a space region positioned between radially adjacent turns of the spiral pattern and filled with the insulating resin layer has a radial aspect ratio of 2 to 4, and wherein a side surface of the spiral pattern along a peripheral direction has a larger surface roughness at its upper region than its lower region.

2. The coil component as claimed in claim 1, wherein the upper region is wider than the lower region.

3. The coil component as claimed in claim 2, wherein a surface roughness Sa of the upper region is 0.2 μm or more, and wherein a surface roughness Sa of the lower region is 0.1 μm or less.

4. The coil component as claimed in claim 1, wherein a surface roughness Sa of the upper region is 0.2 μm or more, and wherein a surface roughness Sa of the lower region is 0.1 μm or less.

5. The coil component as claimed in claim 1, wherein, out of surfaces along a peripheral direction of the spiral pattern, the lower region of an inner peripheral wall of an innermost turn of the spiral pattern and the lower region of an outer peripheral wall of an outermost turn are larger in surface roughness than the lower regions of other side surfaces of the spiral pattern.

6. A method for manufacturing a coil component, the method comprising:

a first step of forming a conductor layer including a spiral pattern spirally wound in a plurality of turns;

a second step of selectively roughening an upper surface and an upper region of a peripheral-direction side surface of the spiral pattern; and a third step of forming an insulating resin layer so as to embed therein the conductor layer, wherein the first to third steps are repeatedly performed, wherein a space region positioned between radially adjacent turns of the spiral pattern has a radial aspect ratio of 2 to 4, and wherein, in the second step, circulation of roughening liquid at a lower region of the side surface of the spiral pattern is suppressed.

* * * * *